United States Patent [19]

Enemark

[11] 4,163,969

[45] Aug. 7, 1979

[54] VARIABLE FREQUENCY LIGHT PULSER FOR SMOKE DETECTORS

[75] Inventor: Robert B. Enemark, Duxbury, Mass.

[73] Assignee: American District Telegraph Company, Jersey City, N.J.

[21] Appl. No.: 808,055

[22] Filed: Jun. 20, 1977

[51] Int. Cl.[2] ...................... G08B 17/10; G01N 21/26

[52] U.S. Cl. .................................... 340/630; 250/574

[58] Field of Search ..................... 340/237.5, 628, 630; 250/574; 356/207

[56] References Cited

U.S. PATENT DOCUMENTS 4,068,130 1/1978 Malinowski ................. 340/237.5 X

*Primary Examiner*—John W. Caldwell, Sr.
*Assistant Examiner*—Daniel Myer
*Attorney, Agent, or Firm*—James H. Grover

[57] ABSTRACT

A scatter type of battery smoke detector includes a clock circuit applying energy pulses to an LED light source which directs light pulses on a smoke sensing path. Smoke entering the light path scatters pulsed light to a photodiode whose output voltage varies with smoke density and corresponding light pulse level. A threshold stage responds to photodiode voltage above a threshold level to generate a detection pulse. The detection pulses and clock pulses are applied to a control circuit including a dual data-type flip-flop logic circuit, and thence to a threshold circuit driving an alarm horn. If the smoke density and hence the detection pulse amplitude exceed a predetermined level, coincident application of the clock and detection pulses to the control circuit will cause the control circuit to respond by energizing the alarm continuously so long as the detection pulses recur at the clock frequency. If a spurious noise voltage should coincide with a clock pulse the control circuit will energize the alarm, but only for the brief inter-pulse interval. To reduce battery drain the inter-pulse is made relatively long by design of the normal clock circuit time constant. But, to reduce the time that a spurious alarm can sound, the clock circuit time constant is shortened substantially when the control circuit responds to coincident pulses.

6 Claims, 1 Drawing Figure

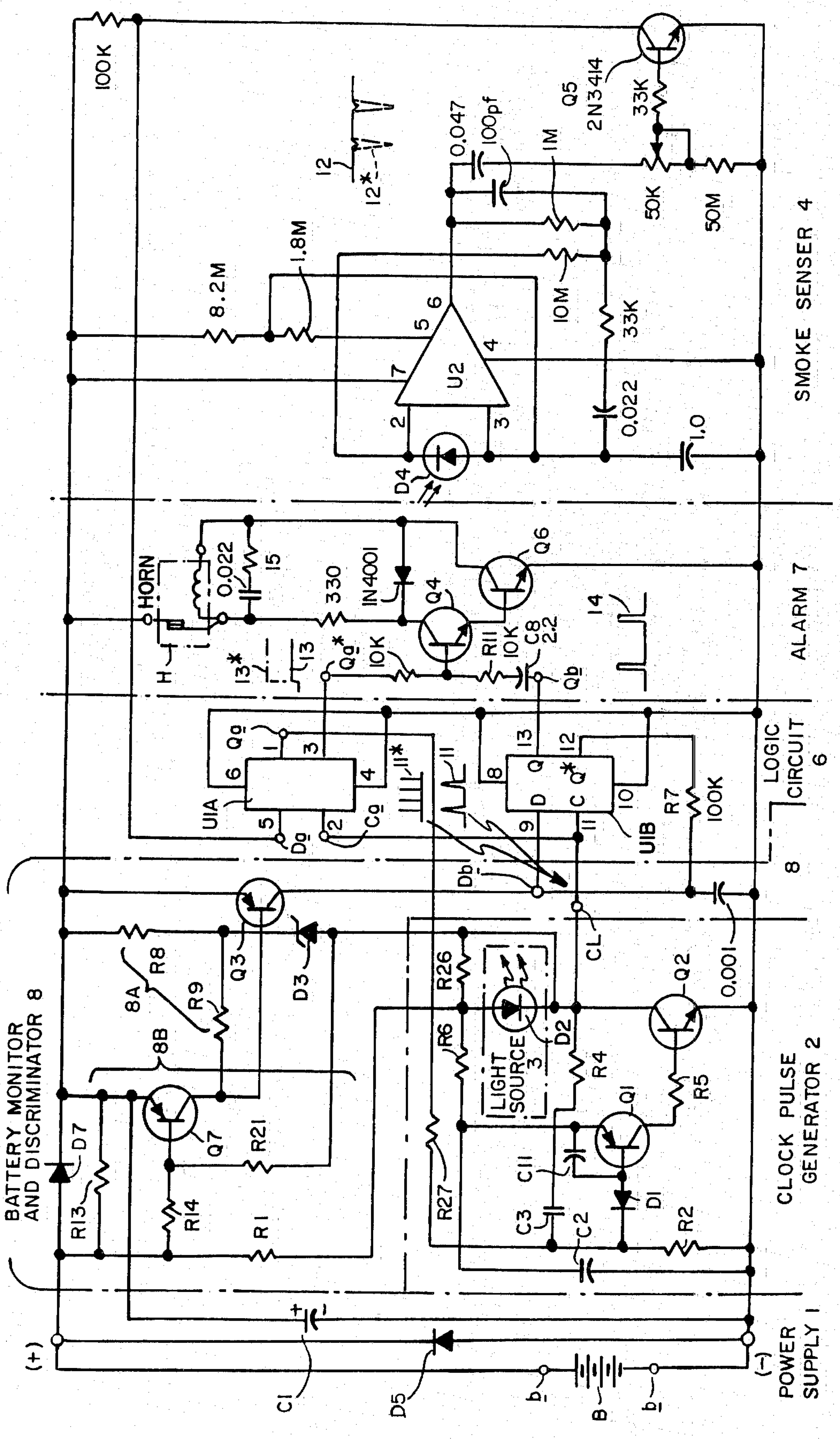
SMOKE SENSER 4
ALARM 7
LOGIC CIRCUIT 6
CLOCK PULSE GENERATOR 2
BATTERY MONITOR AND DISCRIMINATOR 8
POWER SUPPLY 1
LIGHT SOURCE 3
HORN
Q5 2N3414
U2
U1A
U1B
1N4001
100K
8.2M
1.8M
10M
33K
50K
50M
1M
0.047
100pf
0.022
1.0
330
10K
C8 2.2
0.001
R1
R2
R4
R5
R6
R7
R8
R9
R11
R13
R14
R21
R26
R27
C1
C2
C3
C11
D1
D2
D3
D4
D5
D7
Q1
Q2
Q3
Q4
Q6
Q7
8A
8B
CL
Da
Db
Ca
Qa
Qb
(+)
(−)
B

VARIABLE FREQUENCY LIGHT PULSER FOR SMOKE DETECTORS

BACKGROUND OF THE INVENTION

This invention is an improvement on my application Ser. No. 718,686, filed Aug. 30, 1976, now abandoned, for BATTERY POWERED SMOKE DETECTOR, which is incorporated herein by reference, and has for its object to conserve battery energy by pulsing the light source of an optical smoke detector at relatively long intervals, but at the same time reducing a period which a false alarm can sound.

STATEMENT OF INVENTION

According to the invention a smoke detector comprises clock means periodically producing electrical pulses including variable timing means determining the clock period, a light source operated by the clock means to produce pulsed light, photoelectric alarm control means actuated by alteration of the pulsed light to produce an alarm signal recurrently maintained at the period of the clock means, and means responsive to actuation of the control means for varying the timing means and clock period. Variation of the clock period may be incremental or continuous. Preferably the clock period is reduced during alarm from a longer period which normally conserves electrical energy. By recurrently maintained it is meant that the alarm signal is repeatedly continued in successive clock periods.

DRAWING

The single FIGURE is a schematic diagram of an electronic smoke detector circuit according to the invention.

DESCRIPTION

Generally the smoke detector circuit shown comprises a power supply 1 with a dry cell battery B snapped to terminals b connected to positive (+) and negative or ground (−) power busses. The battery powers a clock pulse generator 2 which supplies electrical energy pulses at a clock terminal CL to a light emitting diode D2 (LED) source 3 whose pulsed light, when scattered by smoke from a path indicated by arrows, excites a photodiode D4 of a smoke senser circuit 4. As explained more fully in the aforementioned application Ser. No. 718,686, when the smoke density and scattered, pulsed light increase above a preselected level, the photocell voltages as amplified by an operational amplifier U2 exceeds the threshold of a level detector transistor Q5(2N3414). The pulsed output of the level detector rises from a minimal positive peak level 12 (solid line) to a maximum negative peak level 12* (broken line). These smoke detection pulses 12* are applied to the data input terminal Da of one section U1A of a dual data-type flip-flop logic circuit such as RCA type CD4013AE described in RCA '74 Data Book SSD-2038 *COS/MOS Digital Integrated Circuits, pages* 68 and 69. Substantially simultaneously or coincidently a clock pulse 11 is applied from the clock output CL to the clock input Ca of logic section U1A. So long as maximal negative detection pulses 12* are applied to the flip-flop section U1A coincidentally with clock pulses 11 the section will transfer to and recurrently maintain the flip-flop U1A in a condition in which its inverse output Qa* is maximal positive and adequate to overcome cut-off bias of two transistors Q4(2N3413) and Q6(D32H2) which continuously drive a horn H in an alarm circuit 7 equivalent to that described in said application Ser. No. 718,686.

Battery monitoring and discriminating circuits 8A and 8B respectively sense the voltage and the good/bad energy condition of the battery B. These circuits are not germane to the present invention and are fully described in the copending application of Robert B. Enemark and Paul S. Richtarcsik, Ser. No. 808,065, entitled Battery Discriminator Circuit for Smoke Detectors. The following identification of their components will enable their reproduction:

Battery Monitor

Transistor Q3—2N2907
Zener Diode D3—7 volt
Resistance R8—470 ohms
Resistance R9—470 ohms Battery Discriminator Transistor Q7—2N2907
Diode D7—1N4001
Resistance R13—1 kilohm
Resistance R14—1 kilohm
Resistance R21—18 kilohm
Capacitance C1—450 microfarads If a new battery B connected between battery terminals b has insufficient stored energy the discriminator transistor Q3 applies trouble pulses to the data input Db of a second section U1B of the dual data-type flip-flop at the clock rate. As more fully explained in the aforementioned application Ser. No. 718,686 the flip-flop then applies driving pulses 14 from its output Qb to the horn driving transistor Q4 of the alarm 7 sounding the horn intermittently. Similarly the battery monitor circuit applies trouble pulses to the second flip-flop input Db causing an intermittent alarm when the battery voltage drops below a useful level.

The clock pulse generator 2 comprises an asymmetrical multivibrator, two transistors Q1(2N2907) and Q2 (D32H2) coupled by a resistor R5 (100 ohms). The normal period between pulses of the multivibrator is primarily determined by the discharge time of a resistance-capacitance timing circuit consisting of a 1 microfarad capacitor C3 and a 33 megohm resistor R2 although other impedances in the clock circuit reduce its time constant to about 15 seconds. The timing capacitor C3 is charged from a 100 microfarad capacitor C2 through the emitter and base of the first transistor Q1, diode D1 (1N4454), resistor R4 (22 ohms) and the collector-to-emitter circuit of the second transistor Q2. With both clock transistors conducting during charging of capacitor C3 a clock pulse 11 of about 140 microseconds duration appears at the clock output CL and operating current is drawn by the LED light source D2. The timing capacitor then begins its discharge period.

The normal clock period is selected by design of the timing circuit R2-C3 to be substantially long, about 15 seconds for example, to conserve battery energy. On the other hand the first alarm control section U1A will, on rare occasions, respond to a spurious voltage at its data input Da caused by transitory smoke concentrations, flashes of ambient light and voltage surges in building wiring or the atmosphere, if the spurious voltage is coincident with a clock pulse. Such a spurious coincidence would actuate the first alarm control section U1A and alarm horn H to alarm condition for the normal 15 second period, long enough to disturb or mislead the occupant of the building in which the smoke detector is installed.

But according to the present invention whenever the first section U1A of the alarm controlling logic circuit 6 is actuated, the clock period, and hence the duration of sounding the horn, are substantially reduced. For this purpose a resistor R27, substantially lower, e.g. 18 megohms, in resistance than the resistor R2 (33 megohms) of the clock timing circuit, is connected between the output Qa of the alarm control section U1A and the timing capacitor C3 so as to be placed in parallel with the timing resistor R2 when the control section U1A transfers to alarm condition whether because of a spurious or real smoke detection signal. Whereas the alarm (inverse) output Qa* of section U1A approaches the high positive voltage of the positive bus (+) at coincidence of a maximal negative clock pulse 11 and a smoke detection pulse 12* or its spurious equivalent, the output Qa approaches the negative voltage (−) of the ground bus to which the timing resistor R2 is also connected. Switching the two resistors R2 and R27 in parallel reduces their joint resistance and also reduces the discharge time and clock period, in the example given, by a factor of about three as shown by voltage 11* at the clock output CL. A spuriously caused alarm will then last only 5 seconds instead of 15. Further reductions to a clock period and alarm duration of approximately one half second maybe desirable. Although genuine smoke detection signals will also cause the clock period to be shortened, sounding of the horn H will remain continuous since the recurring detection signal 14* caused by smoke recurrently maintains the alarm control section U1A in alarm condition.

It should be understood that the present disclosure is for the purpose of illustration only and that this invention includes all modifications and equivalents which fall within the scope of the appended claims.

I claim:

1. A smoke detector comprising:
clock means periodically producing electrical pulses including means determining the clock period,
a light source connected to and operated by the clock means to produce pulsed light at the clock period,
photoelectric alarm control means actuated by smoke alteration of the pulsed light to produce an alarm signal output recurrently maintained at the period of the clock means, and
means responsive to actuation of the control means for controlling the means determining clock period.

2. A smoke detector according to claim 1 wherein the clock period determining means includes an alterable impedence.

3. A smoke detector according to claim 1 wherein the clock period determining means includes a circuit with resistive and capacitative impedances, and the alarm control alters one of said impedances.

4. A smoke detector according to claim 3 wherein the alarm control includes means switching additional impedance in the timing circuit.

5. A smoke detector according to claim 4 wherein the switching means comprises a data-type flip-flop stage with an alarm signal output and an inverse output coupled to the clock period determining means.

6. A smoke detector according to claim 1 wherein the control means is actuated by substantially coincident application of light pulses and clock pulses.

* * * * *